(12) United States Patent
Sachs et al.

(10) Patent No.: US 8,860,818 B1
(45) Date of Patent: Oct. 14, 2014

(54) METHOD FOR DYNAMICALLY CALIBRATING ROTATION OFFSET IN A CAMERA SYSTEM

(71) Applicant: Apple Inc., Cupertino, CA (US)

(72) Inventors: Todd S. Sachs, Palto Alto, CA (US);
Kevin L. Hunter, Sunnyvale, CA (US);
Marco Zuliani, Los Gatos, CA (US);
Claus Molgaard, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/955,467

(22) Filed: Jul. 31, 2013

(51) Int. Cl.
*H04N 17/00* (2006.01)
*H04N 5/232* (2006.01)

(52) U.S. Cl.
CPC ......... *H04N 5/23216* (2013.01); *H04N 17/002* (2013.01)
USPC ............................................ 348/187; 348/180

(58) Field of Classification Search
USPC ........ 348/180, 187, 188, 583; 702/85, 94, 95, 702/150–153
IPC .................................... H04N 17/00,17/02, 9/74
See application file for complete search history.

(56) References Cited

U.S. PATENT DOCUMENTS

| | | | |
|---|---|---|---|
| 8,358,321 | B1 | 1/2013 | Weidner |
| 2008/0306708 | A1 | 12/2008 | Germain, IV et al. |
| 2011/0292166 | A1* | 12/2011 | Schall et al. ..................... 348/37 |
| 2012/0154633 | A1 | 6/2012 | Rodriguez |
| 2012/0237085 | A1 | 9/2012 | Meier |
| 2014/0104437 | A1* | 4/2014 | Chao et al. .................... 348/187 |

OTHER PUBLICATIONS

Ronald Azuma "Orientation Tracking for Outdoor Augmented Reality Registration" 8th International Conference in Central Europe on Computer Graphics, Visualization, and Digital Interactive Media. Feb. 2000, Czech Republic. pp. 36-42.

* cited by examiner

*Primary Examiner* — Sherrie Hsia
(74) *Attorney, Agent, or Firm* — Robert C. Kowert; Meyertons, Hood, Kivlin, Kowert & Goetzel, P.C.

(57) ABSTRACT

A method for dynamically calibrating rotational offset in a device includes obtaining an image captured by a camera of the device. Orientation information of the device at the time of image capture may be associated with the image. Pixel data of the image may be analyzed to determine an image orientation angle for the image. A device orientation angle may be determined from the orientation information. A rotational offset, based on the image orientation angle and the device orientation angle, may be determined. The rotational offset is relative to the camera or orientation sensor. A rotational bias may be determined from statistical analysis of numerous rotational offsets from numerous respective images. In some embodiments, various thresholds and predetermined ranges may be used to exclude some rotational offsets from the statistical analysis or to discontinue processing for that image.

20 Claims, 8 Drawing Sheets

METHOD FOR DYNAMICALLY CALIBRATING ROTATION OFFSET IN A CAMERA SYSTEM

BACKGROUND

1. Technical Field

This disclosure relates generally to digital imaging calibration, and, more specifically, to calibration of rotational offset in digital imaging.

2. Description of the Related Art

Device sensors, for example, camera sensors on portable devices, are allowed certain tolerances, both during manufacture of the sensor and as part of incorporation of the sensor into a device. Ideally, a camera sensor will be aligned with the body of the device such that the axes of the photo array or pixels are aligned with the axes of the device as well as the axes of an orientation sensor of the device. However, due to manufacturing tolerances, the ideal alignment requires expensive components and challenging manufacturing. Various features of the manufacturing process, for example, tolerances related to mounting of the camera module in the device, or mounting of the image sensor die in the camera module mean that the camera is often rotationally misaligned with the device. Such misalignment may cause the captured image to be rotated from a desired alignment.

Camera orientation within a device can be calibrated during manufacturing. For example, the rotational misalignment of the image sensor die with respect to the device casing or the gravity vector of the orientation sensor in the device can be measured and used for calibration as part of the manufacturing process, but such calibration increases the manufacturing time and cost. Such methods of camera sensor alignment require significant investment of resources (e.g., materials and time) by the manufacturer. Additionally, accurate alignment during manufacture cannot possibly account for changes over time (e.g., due to drops) and as such, an initial alignment or calibration may become obsolete.

SUMMARY OF EMBODIMENTS

Various embodiments of methods, devices and computer-readable storage media for determining a rotational offset of a sensor in a device are described. Various embodiments may obtain an image captured by a camera and also obtain orientation information of an orientation sensor of the device. The orientation information of the device is from the time of image capture. Pixel data of the image may be analyzed to determine an image orientation angle for the image. A device orientation angle may be determined from the orientation sensor information. A rotational offset may be determined, based on the image orientation angle and the device orientation angle. The rotational offset may be relative to the camera or orientation sensor.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units...." Such a claim does not foreclose the apparatus from including additional components (e.g. a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of a system and method for dynamically measuring the amount of rotational offset present in a camera system relative to the device in which the camera is mounted are disclosed.

In one embodiment, the method of dynamically measuring rotational offset uses two different horizon detection schemes. The first scheme is a pixel-based scheme that analyzes the actual image and returns the angle a horizon-line line within the image makes with respect to the x-axis of the image (for example, this may determine a device rotation due to a device users hand positioning). Note that it may not be necessary for the algorithm to find the actual horizon. In some cases, a pixel-based horizon line (e.g., horizontal line running through the image) may be sufficient as a substitute for the horizon, for example. This first scheme determines the camera position relative to the scene captured. The second scheme is a sensor-based scheme that uses an orientation sensor information from a sensor to find a sensor-based (e.g., gravity-based) horizon line. For example, this may determine the user's hand rotation of the device. The sensor-based scheme may provide a frame of reference relative to the camera body. In some embodiments, an accelerometer or gyro sensor provides an indication of the direction of gravity with respect to the device position. To the extent that the first scheme accurately finds a pixel-based horizon line, and either the orientation sensor or the image sensor has been calibrated or aligned with respect to the device casing, the difference in angle between the pixel-based horizon line and the sensor-based horizon line may provide an indication of the rotational offset between the camera and the x-axis of the device to which the camera is mounted. Regardless, the method may determine the rotational relationship between the pixel-based horizon and the orientation sensor-based horizon.

In some embodiments, a particular instance of the pixel-based method may not be as accurate as desired. However, improvements in accuracy of the pixel-based method may be achieved by statistical analysis of numerous repetitions of the pixel-based method. For example, a curve fit or mode of histogram method may be used to reject outliers and determine a more accurate relationship between the pixel-based and sensor-based horizon lines.

In some embodiments, multiple calculations of a rotational offset may be statistically analyzed to determine a rotational bias of a sensor or of the device. The rotational offset or rotational bias of a camera system may be used for numerous features of a device such as a sweep panorama and horizon adjustments, although the offset or bias may be used for many other reasons as well. However, the features may be dependent upon tolerances that are much more narrow than the chosen manufacturing process provides (camera modules can have a mounting bias of several degrees, for example) or even can provide. If a rotational offset or bias is known, however, it is possible to use the rotational offset or bias to make up for the deficient tolerances and provide much more precise adjustments for any number of device functions, including sweep panorama, horizon adjustments, or automated correcting for unintended image rotation during cropping of an image, for example.

In some embodiments, a rotational offset or rotational bias may be used in real-time image capture, for example, to adjust the rotation of the image being captured as it is captured (e.g., in real time). Such functionality may be particularly useful for images or video that is directly uploaded to some sort of virtual storage, such as a video or photo storage or a video or photo sharing website, for example.

In some embodiments, temporally filtered accelerometer orientation sensor information may be used. For example, accelerometer sensor output may be captured at the same time an image is captured, or an orientation may be calculated at the time of capture. In some embodiments it may be assumed that the accelerometer is more accurately aligned in the device housing than the camera. However, for instances where the camera is more accurately aligned, similar techniques may be used to determine the offset of the accelerometer sensor.

Various accelerometers may use different terminology. For clarity within this disclosure it may be useful to describe a few conventions. An acceleration sensor may be oriented within a device several ways and the orientation may affect the output of the sensor. In some embodiments, a single number output from an accelerometer may refer to a single axis accelerometer, in which case the sign can be present (e.g., a zero value can occur if the axis of accelerometer is orthogonal to gravity). For example, for some devices with an accelerometer oriented with the base up, output of the sensor is +1 g. In another example, for some devices with an accelerometer oriented with the base horizontal, output of the sensor is 0 g. In yet another example, for some devices with an accelerometer oriented with the base pointed downward, output of the sensor is −1 g.

A single number output from an accelerometer may also refer to the magnitude of a multi-axis gyro, in which case the sign is not present (a zero is possible if gravity is orthogonal to the plane of a 2 axis accelerometer, or for 1, 2, or 3 axis accelerometers if the device is in free fall). In some embodiments, for purposes of rotational orientation, at least a 2-axis accelerometer may be used. In other embodiments, a 3-axis accelerometer may be used to get pitch, orientation, and confidence value.

Generally, within this disclosure, reference will be made to a device with an accelerometer oriented with the base up, and output of the sensor is +1 g in this orientation. Other conventions for the output of the sensor are contemplated and do not depart from the scope of the invention. Various confidences are described throughout the disclosure. An exemplary confidence pertaining to the accelerometer considers the magnitude of the gravity vector and, if the magnitude is off from +1 g by more than a few percent, the gravity vector may be associated with a low confidence. It is contemplated that for other accelerometer orientations (e.g., base pointed downward) a low confidence can still be determined, albeit from determining a similar magnitude of difference from the appropriate output (e.g., −1 g, respectively).

Accelerometers are capable of measuring the amount of static acceleration due to gravity; thus, it is possible to determine the angle the sensor (and the device the sensor is mounted in) is tilted at with respect to the earth. An orientation may be calculated from the captured accelerometer output for the x-axis, for example, Orientation=$a \tan 2(Ay, Ax)$.

A pitch angle can also be calculated, for example,

Pitch=$a \tan 2(Az, \text{sqrt}(Ax^2+Ay^2))$.

The pitch angle may be used as a measure of quality of the orientation. For example, if the pitch is greater than 25 degrees for example, it may be assumed that the camera is being intentionally operated in such a manner (e.g., looking up or down) such that the horizon is not the focus of the image capture. Although pitch angles greater than 10 or 15 degrees may also be useful, for example.

In another embodiment, temporally filtered gyro output may be fused with the accelerometer output. The results may be delivered as a quaternion, with the magnitude normalized out. In some embodiments, accuracy of the sensor orientation may be improved by use of the gyro output.

Orientation devices, such as accelerometers and gyroscopes may be sensitive to temperature changes. In some embodiments, the methods disclosed herein may be used to calibrate the device to compensate for such changes. For example, for a given orientation, a gyroscopic output may change based on a temperature change of the gyroscope environment. By application of the methods disclosed herein, the device may re-calibrate to compensate for the bias introduced by the temperature change, for example, by applying the determined rotational offset to the gyroscope instead of the camera.

In various exemplary embodiments, a pixel-based horizon line may be calculated from images captured by the camera. In some embodiments, an x-axis of the image may be determined relative to a row of pixels associated with the image sensor, wherein the x-axis of the image is parallel to a row of pixels of a photo sensor array of the camera.

In some embodiments, a pixel-based horizon line may be determined by using a fast Fourier transform (FFT) to determine a discrete Fourier transform by decomposing a sequence of the values from the image data into components of different frequencies. Using a FFT may take advantage of the fact that edges in the spatial domain have a signature in the spatial frequency domain of image data. This particular method may be useful for outdoor scenes because natural images tend to have edges oriented in horizontal or vertical directions (e.g., trees and buildings are aligned with gravity, ground and strata are, on average, aligned perpendicular to gravity). Note that such strategies may be applied to determine image orientation based on either a horizontal based analysis (as disclosed herein) or with a vertically based analysis without departing from the scope of the invention disclosed herein.

In some embodiments, using a FFT has been found particularly useful when the image orientation angle is within a certain range. For example, when the image orientation angle is greater than 1 degree but less than 10 degrees. The range may be configurable, either by the user or device manufacturer. When the image orientation angle is above a certain threshold, it is likely that the camera user intended to capture the image at an angle. It is also likely that applying the determined angle with a subsequent cropping, for example, will crop away too much of the image after a rotation. When the angle is below a certain threshold, it may be preferred to avoid applying a corrective rotation to the image instead of correcting the orientation flaw.

In some embodiments, a rotational offset is determined, based on the device orientation and the image orientation. Rotational offsets may be determined for one or more images. The rotational offsets may be statistically analyzed for a number of images to determine a rotational bias of the device. As more images are analyzed, the rotational bias may get more accurate.

In some embodiments disclosed herein, a user-selectable application or mode of operation may include a calibration mode. The calibration mode may take advantage of a known angle between a mounting surface for the device and horizontal line that can be captured in an image by the device while the device is on the mounting surface. Such an environment may provide for increased accuracy of the determination of the rotational offset. Such an environment could also greatly reduce the number of repetitions necessary for calculation of the rotational bias.

In some embodiments, orientation determination may run continuously, or for every image. For example, when the device is relatively new and no bias has been determined or when the rotational bias remains set to a default value. In various embodiments, the offset determination for an image or the rotational bias determination for the device may be performed periodically or intermittently. To reduce power consumption or to free up processing power, for example. In some embodiments, the method may be user selectable.

In some embodiments, the method may be performed without any particular images being intentionally captured by a user. For example, on some devices, the camera may always be on or may have a mode for selecting portions of time or geographic areas for the camera to be on. In other examples, a camera is on for short periods of time before an image is captured by the user, for example, when the operator is aligning the scene of the image or after an image has been intentionally captured by the operator, such as before timing out. These times may be extra opportunities for calibration. In some embodiments, images may be obtained during these opportunities for calibration and the analysis disclosed herein may be performed.

In some embodiments, a rotational offset may be calculated without using a device orientation angle from an orientation sensor. For example, in some embodiments, a rotational offset may be determined to be the image orientation angle. Multiple rotational offsets, also determined without using a device orientation angle may be accumulated and statistically analyzed to determine a rotational bias.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Some portions of the detailed description which follow are presented in terms of algorithms or symbolic representation of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software and other programmable electronic devices. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Embodiments of electronic devices, user interfaces for such devices, and associated processes for using such devices are described. In some embodiments, the device is a portable communications device, such as a mobile telephone, that also contains other functions, such as PDA and/or media player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). Other devices employing the methods describe herein may be digital cameras, parts of digital camera systems, video camera, and cinema cameras.

In the discussion that follows, an electronic device that includes a display and a touch-sensitive surface is described. It should be understood, however, that the electronic device may include one or more other physical user-interface devices, such as a physical keyboard, a mouse and/or a joystick.

Figure 1:
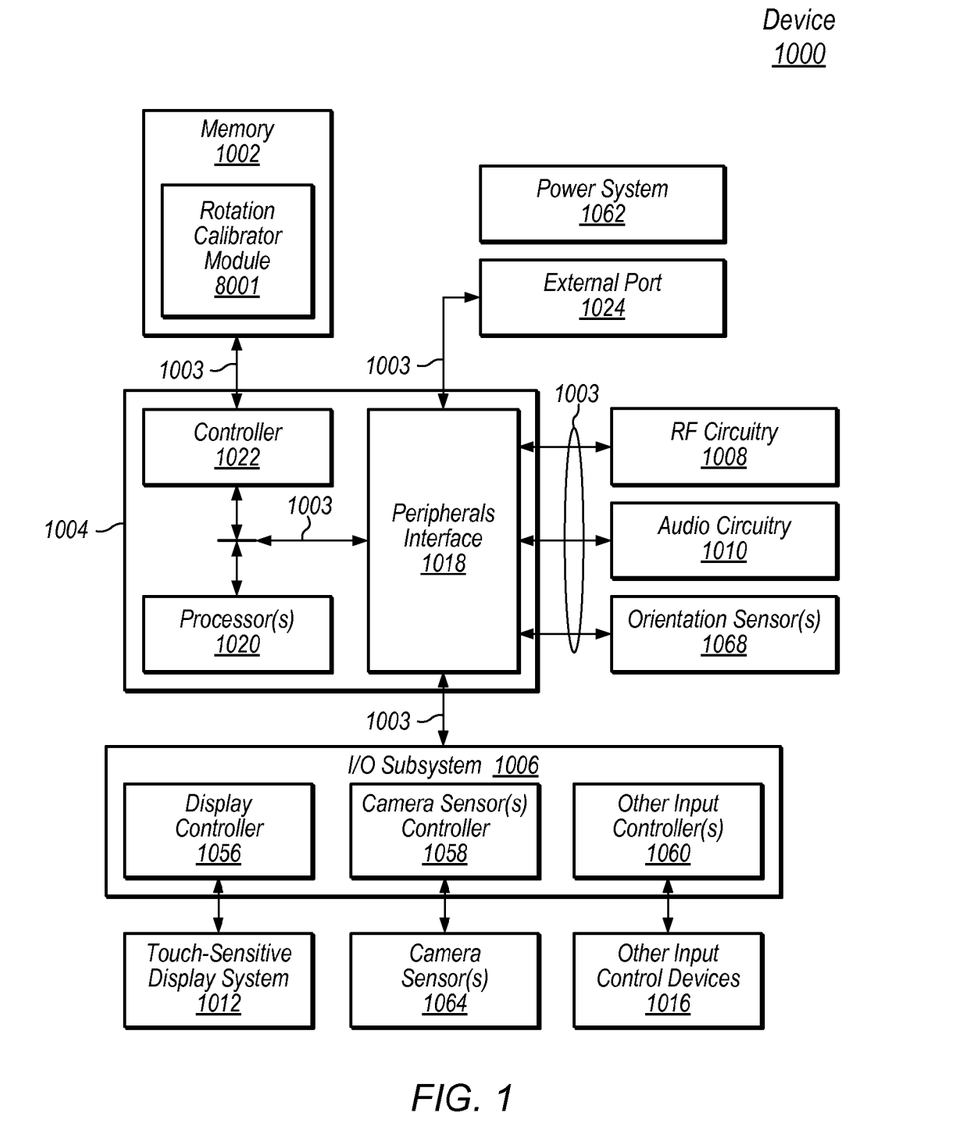
FIG. 1 illustrates an example device system according to some embodiments.

Attention is now directed toward embodiments of portable video capture and recording devices. FIG. 1 is a block diagram illustrating portable multifunction device 1000 with touch-sensitive displays 1012 in accordance with some embodiments. Touch sensitive display 1012 is sometimes called a "touch screen" for convenience, and may also be known as or called a touch-sensitive display system. Device 1000 may include memory 1002 (which may include one or more computer readable storage mediums), memory controller 1022, one or more processing units (CPU's) 1020, peripherals interface 1018, RF circuitry 1008, audio circuitry 1010, orientation sensor(s) 1068, input/output (I/O) subsystem 1006, other input or control devices 1016, and external port 1024. Device 1000 may include various microphones and speakers (not illustrated).

Device 1000 may include one or more camera sensors 1064 and camera sensor controllers 1058. These components may communicate over one or more communication buses or signal lines 1003. It should be appreciated that device 1000 is only one example of a portable video capture and recording device, and that device 1000 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

Memory 1002 may include high-speed random access memory and may also include non-volatile memory, such as one or more magnetic disk storage devices, flash memory devices, or other non-volatile solid-state memory devices. Access to memory 1002 by other components of device 1000, such as CPU 1020 and the peripherals interface 1018, may be controlled by memory controller 1022.

Peripherals interface 1018 can be used to couple input and output peripherals of the device to CPU 1020 and memory 1002. The one or more processors 1020 run or execute various software programs and/or sets of instructions stored in memory 1002 to perform various functions for device 1000 and to process data.

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

In some embodiments, peripherals interface 1018, CPU 1020, and memory controller 1022 may be implemented on a single chip, such as chip 1004. In some other embodiments, they may be implemented on separate chips. RF (radio frequency) circuitry 1008 receives and sends RF signals, also called electromagnetic signals. RF circuitry 1008 converts electrical signals to/from electromagnetic signals and communicates with communications networks and other communications devices via the electromagnetic signals. RF circuitry 1008 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of multiple communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 1006 couples input/output peripherals on device 1000, such as touch screen 1012 and other input control devices 1016, to peripherals interface 1018. I/O subsystem 1006 may include display controller 1056 and one or more input controllers 1060 for other input or control devices. The one or more input controllers 1060 receive/send electrical signals from/to other input or control devices 1016. The other input control devices 1016 may include physical buttons (e.g., push buttons, rocker buttons, etc.), dials, slider switches, joysticks, click wheels, and so forth. In some alternate embodiments, input controller(s) 1060 may be coupled to any (or none) of the following: a keyboard, infrared port, USB port, and a pointer device such as a mouse.

Touch-sensitive display 1012 provides an input interface and an output interface between the device and a user. Display controller 1056 receives and/or sends electrical signals from/to touch screen 1012. Touch screen 1012 displays visual output to the user. The visual output may include graphics, text, icons, video, and any combination thereof (collectively termed "graphics"). In some embodiments, some or all of the visual output may correspond to user-interface objects.

Device 1000 also includes power system 1062 for powering the various components. Power system 1062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1000 may also include one or more optical sensors 1064. Optical sensor 1064 may include charge-coupled device (CCD) or complementary metal oxide semiconductor (CMOS) phototransistors. Optical sensor 1064 receives light from the environment, projected through one or more lens, and converts the light to data representing an image. Optical sensor 1064 may capture still images or video. In some embodiments, an optical sensor is located on the back of device 1000, opposite touch screen display 1012 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 1000 includes one or more orientation sensors 1068. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1000. In some embodiments, the one or more orientation sensors include any combination of orientation/rotation sensors. In some embodiments, the one or more orientation sensors 1068 may be coupled to an input controller 1060 in I/O subsystem 1006. In some embodiments, information is displayed on the touch screen display in a portrait view or a landscape view based on an analysis of data received from the one or more orientation sensors.

In some embodiments, the software components stored in memory 1002 include a rotation calibrator module 7001. The software components stored in memory 1002 may also include an operating system, communication module (or set of instructions), contact/motion module (or set of instructions), graphics module (or set of instructions), text input module (or set of instructions) Global Positioning System (GPS) module (or set of instructions), and applications (or sets of instructions) (all not illustrated).

In conjunction with touch screen 1012, display controller 1056, camera sensor(s) 1064, camera sensor controller 1058 and a camera module (not illustrated) may include executable instructions to capture still images or video (including a video stream) and store them into memory 1002, modify characteristics of a still image or video, or delete a still image or video from memory 1002.

In conjunction with touch screen 1012, display controller 1056 and a camera module, an image management module (not illustrated) may include executable instructions to arrange, modify (e.g., edit), or otherwise manipulate, label, delete, present (e.g., in a digital slide show or album), and store still and/or video images.

In conjunction with touch screen 1012, display system controller 1056, a graphics module, audio circuitry, speaker and RF circuitry 1008, a media player module not illustrated) may include executable instructions that allow the user to download and play back recorded media and other sound files stored in one or more file formats, such as MP3 or AAC files, and executable instructions to display, present or otherwise play back videos (e.g., on touch screen 1012 or on an external, connected display via external port 1024).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1002 may store a subset of the modules and data structures identified above. Furthermore, memory 1002 may store additional modules and data structures not described above.

In some embodiments, device 1000 is a device where operation of a predefined set of functions on the device is performed exclusively through a touch screen and/or a touchpad. By using a touch screen and/or a touchpad as the primary input control device for operation of device 1000, the number of physical input control devices (such as push buttons, dials, and the like) on device 1000 may be reduced.

The predefined set of functions that may be performed exclusively through a touch screen and/or a touchpad include navigation between user interfaces. In some embodiments, the touchpad, when touched by the user, navigates device 1000 to a main, home, or root menu from any user interface that may be displayed on device 1000. In such embodiments, the touchpad may be referred to as a "menu button." In some other embodiments, the menu button may be a physical push button or other physical input control device instead of a touchpad.

Figure 2:
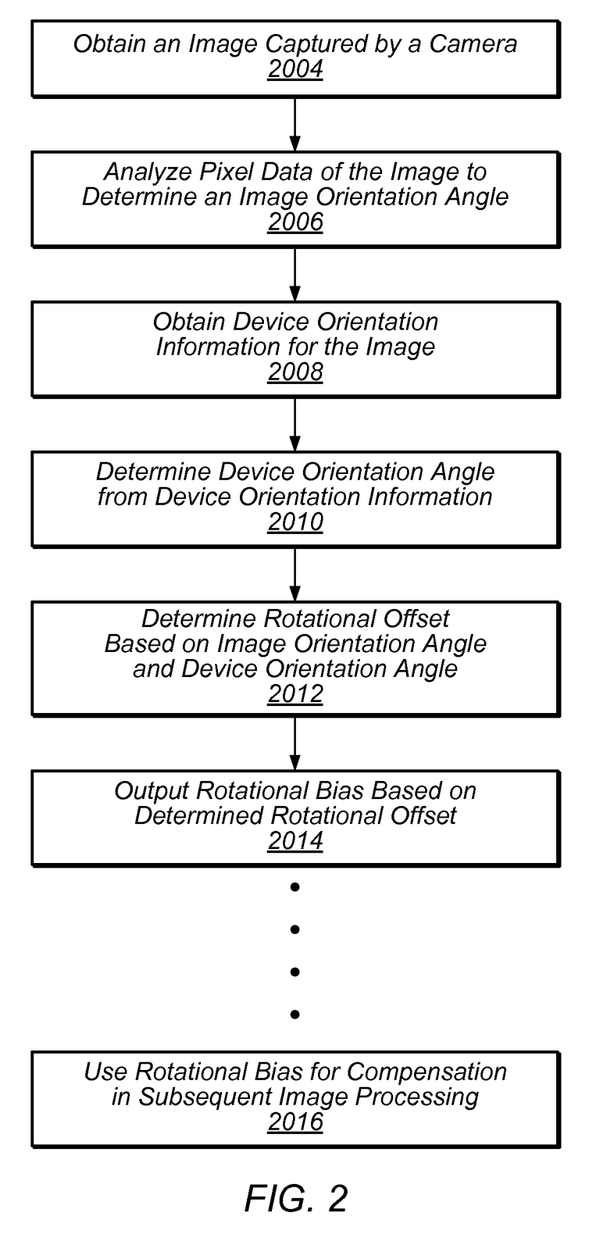
FIG. 2 illustrates a flow diagram of a method for determining a rotational offset in a camera system according to some embodiments.

FIG. 2 illustrates a flow diagram of a method for determining a rotational offset in a camera system according to some embodiments. In some embodiments the method illustrated in FIG. 2 may be performed, at least in part, by rotation calibrator module 7001 illustrated in FIG. 7, device 1000 of FIG. 1 or device 4000 of FIG. 4. In some embodiments, the method includes determining both a device based orientation and an image based orientation. For example, a device based orientation may be determined from a gravity vector of an accelerometer. An image based orientation may be determined from a pixel based determination of a horizon line of the image that is compared to the x-axis of the image. Comparing the two orientations can produce a rotational offset between the camera sensor and the orientation sensor. When the analysis is performed over numerous images, the results may be statistically analyzed to produce a rotational bias for the device.

In some embodiments, the method may be performed on a device other than the one the image was captured on. For example, the images and device orientation information may be transferred to the memory or data store of a PC from the memory or data store of a smart phone with a camera such that the method can be carried out and a rotational offset or rotational bias determined. The offset or bias may be transferred back to the smart phone for compensation in image processing or used by the PC for image processing of images from the smart phone.

At block 2004, an image captured by a camera is obtained. The image captured by the camera may be obtained from memory, such as memory 1002 in FIG. 1, for example. In an alternative embodiment, the image may be obtained directly from camera sensor 1064 of FIG. 1 or camera 4120 of FIG. 4. At block 2006, pixel data of the image is analyzed to determine an image orientation angle. For example, rotation calibrator module 7001 may determine an image orientation angle from analysis of the pixel data of an image stored in memory 1002.

At block 2008, device orientation information may be obtained for the image. For example, device orientation information may be obtained from meta data associated with the image. The orientation information may have been captured at the same time as the image capture and stored with the image data in memory 1002 of device 1000. At block 2010, a device orientation angle may be determined from the device orientation information. For example, the device orientation information may include a gravity vector from orientation sensor 1068 (e.g., an accelerometer) and the rotation calibrator module 7001, illustrated in FIG. 7, may determine the angle orthogonal to the gravity vector as the device orientation angle.

At block 2012, a rotational offset may be determined based on an image orientation angle and a device orientation angle. For example, a rotational offset may be determined by subtracting the device orientation angle (illustrated as angle 4006 in FIG. 4) from the image orientation angle (illustrated as angle 4020 in FIG. 4). As will be appreciated by one of ordinary skill in the art, in various embodiments, other types of numerical determination may be used to determine a rotational offset based on the image orientation angle and the device orientation angle without departing from the scope of the invention.

At block 2014, a rotational bias, based on the rotational offset, may be output. For example, rotation calibrator module 7001 may output a rotational bias, based on statistical analysis of one or more rotational offset(s), as described above. At block 2016, a rotational bias may be used in subsequent image processing. For example, to adjust alignment of an image before cropping or for supporting sweep panorama functionality.

Figure 3:
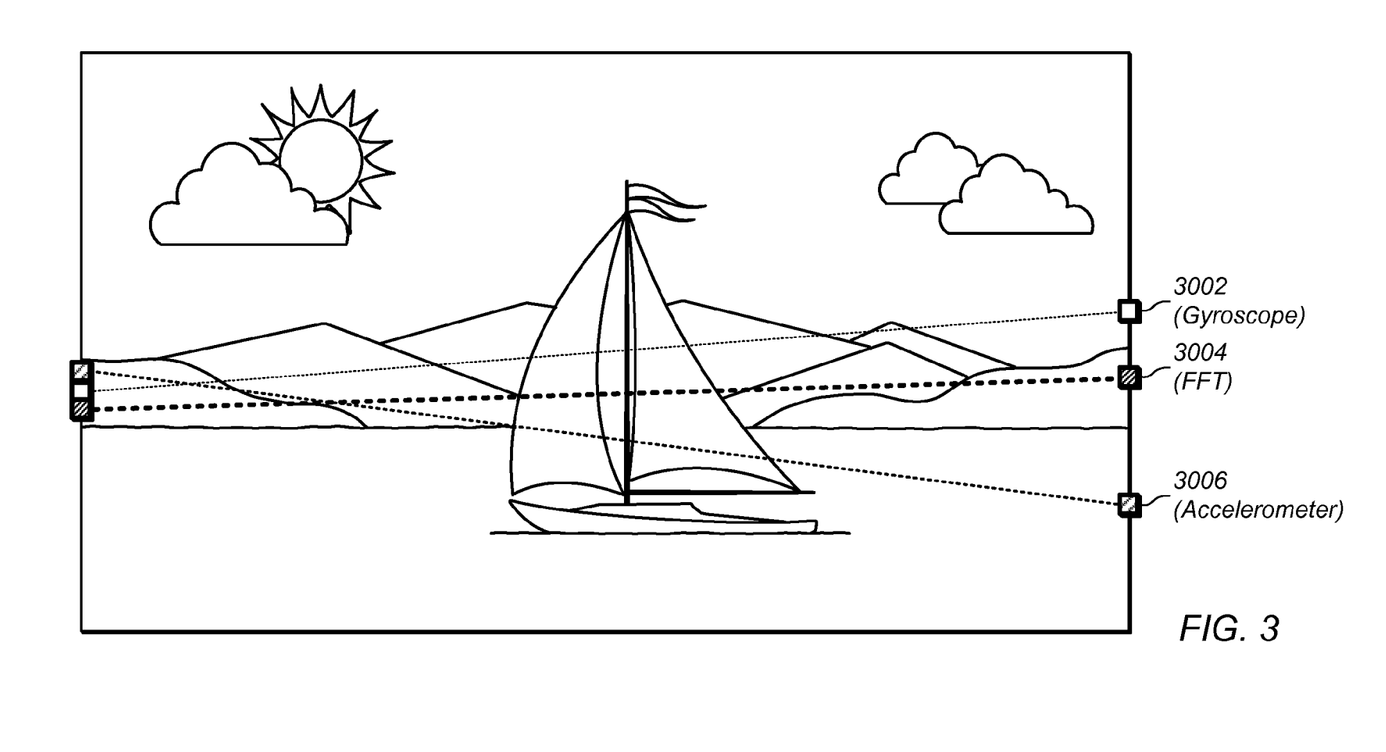
FIG. 3 illustrates output of various methods and components of a device in a hypothetical situation according to some embodiments.

FIG. 3 illustrates output of various methods and components of a device in a hypothetical situation according to some embodiments. The angles are determined by various methods. FIG. 3 illustrates that when the device is moving or being moved, measurements from the accelerometer or the gyroscope may not be as determinative of the device orientation, with respect to gravity, as when the device is held still. A camera is normally held still in order to take a still photo; movement of the camera may result in a blurry image. However, when the operator of the device is holding the camera device still relative to the operator, but the operator is being moved (for example, in a car or a boat) the orientation sensors may still provide data that is less valuable. For example, in FIG. 3, because the angles of the gyroscope line 3002, FFT line 3004 and accelerometer line are all different by such a magnitude, it is likely that the input data associated with this image should not be used for a rotational offset calculation.

The hypothetical situation illustrates that various methods of determining a horizon line may produce various results. For example, if an image is captured by a device within a car as the car is traveling around the bend in the road, a gyroscope and an accelerometer may not reliably provide an indication of the device orientation. Because the gyroscope and the accelerometer are both affected by the motion of the vehicle in which they are traveling, the sensor output cannot be relied upon to determine sensor orientation and inferentially, the device orientation. As illustrated in FIG. 3, the hypothetical situation may be capturing an image of a boating scene from another moving boat, for example. In FIG. 3, the three roughly horizontal lines illustrate three orientation angles determined by three different orientation angle determination methods.

In one example, the device orientation line may be determined from device orientation information from orientation sensor 1068. Orientation sensor 1068 may be a gyroscope that outputs gyroscopic device orientation information or an accelerometer that outputs accelerometric device orientation information. Line 3002 illustrates a device orientation line determined by a gyroscopic sensor in the hypothetical situation of taking a photo while aboard an undulating boat. Line 3004 illustrates an image orientation line determined by analysis of the frequency domain of the image. For example, a fast Fourier transform may transform the image data to determine a dominant angle in the image. Line 3004 crosses the image in FIG. 3 at an angle determined by the frequency analysis. Line 3006 illustrates another device orientation angle determined by another orientation sensor, for example, an accelerometer. Note that the output from the orientation sensors was captured at the same time the image was captured.

Also note that not only is it possible for the gyroscope and accelerometer to provide different magnitudes of their orientation, but it is possible for them to provide different directions of their orientations as well. For example, line 3002 illustrates an angle with the horizon, output from the gyroscope of a device that indicates a device orientation skewed to the left. Line 3006 illustrates an angle with the horizon output from an accelerometer from the same device at the same time that indicates a device orientation skewed to the right.

Figure 4:
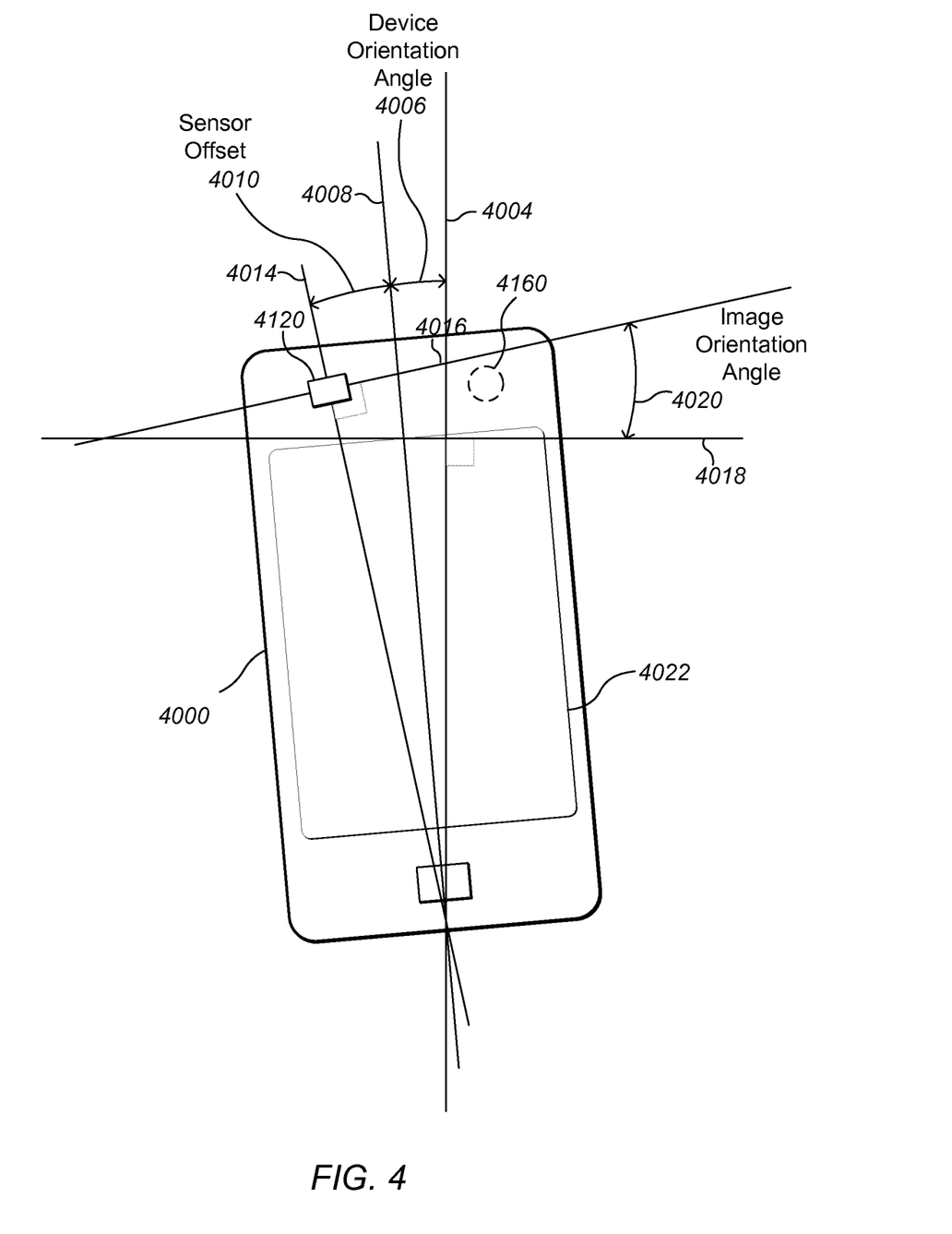
FIG. 4 illustrates a device and various angles and lines relative to the device and components of the device in accordance with various embodiments.
Figure 6:
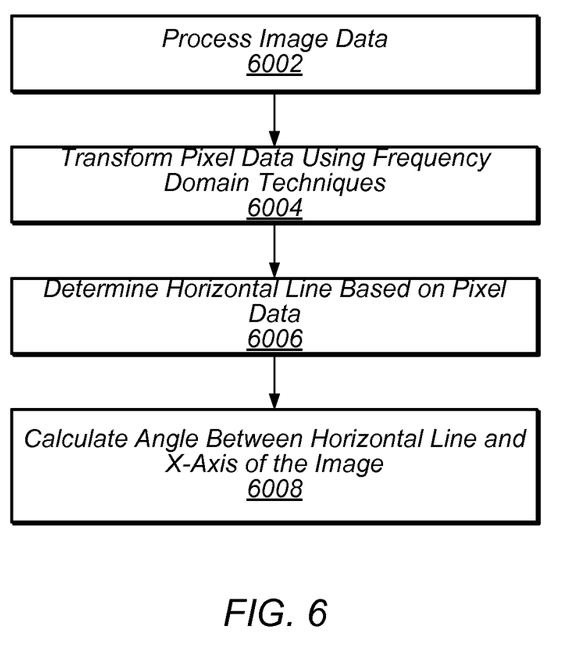
FIG. 6 illustrates a method of determining an image orientation angle according to some embodiments.

FIG. 4 illustrates a device and various angles and lines relative to the device and components of the device in accordance with various embodiments. In FIG. 4, a portable device 4000 with camera 4120, orientation sensor 4160 and image display area 4022 is illustrated. Line 4018 represents an image horizon line. The image horizon line of the image may be determined numerous ways, including the transfer of pixel data to the frequency domain, and based on the transferred pixel data, determining a dominant angle of the image. For example, with the application of frequency domain techniques such as Fourier transforms to the image data. One exemplary method of determining an image horizon line is illustrated in FIG. 6, described below.

In some embodiments, the image horizon line is an estimate of a theoretical horizon line running orthogonal to gravity. In some embodiments, the image horizon line is an estimate of the horizon in the scene captured by the image. In some embodiments, the horizon line is an estimate of a line running orthogonal to the trunk of a tree or the lines of a building, for example.

Line 4016 illustrates the centerline of the x-axis of the sensor 4120. When line 4016 intersects with line 4018 (illustrating the image horizon line) and an image orientation angle 4020 is formed. Device orientation angle 4006 is illustrated between lines 4004 and 4008 which represent a vertical line (90 degrees from horizontal) and a device orientation line (running through the centerline of the device), respectively. Vertical sensor orientation line 4014 (running through the centerline of the camera sensor 4120) is also illustrated.

The camera offset angle 4010 may be determined from the image orientation angle 4020 and the device orientation angle 4006. For example, in FIG. 4, the x-axis 4016 of the image forms a 12.4 degree image orientation angle with the image horizon line 4018. Also, the device orientation line 4008 forms a 5 degree angle with the vertical line 4004. By subtracting the device orientation angle (5 degrees) from the image orientation angle (12.4 degrees) it is possible to determine a camera offset angle 4010 of 7.4 degrees. Statistically analyzing many of the off-set values over time can result in convergence to a rotation calibration value that may be used as a rotational bias.

Figure 5A:
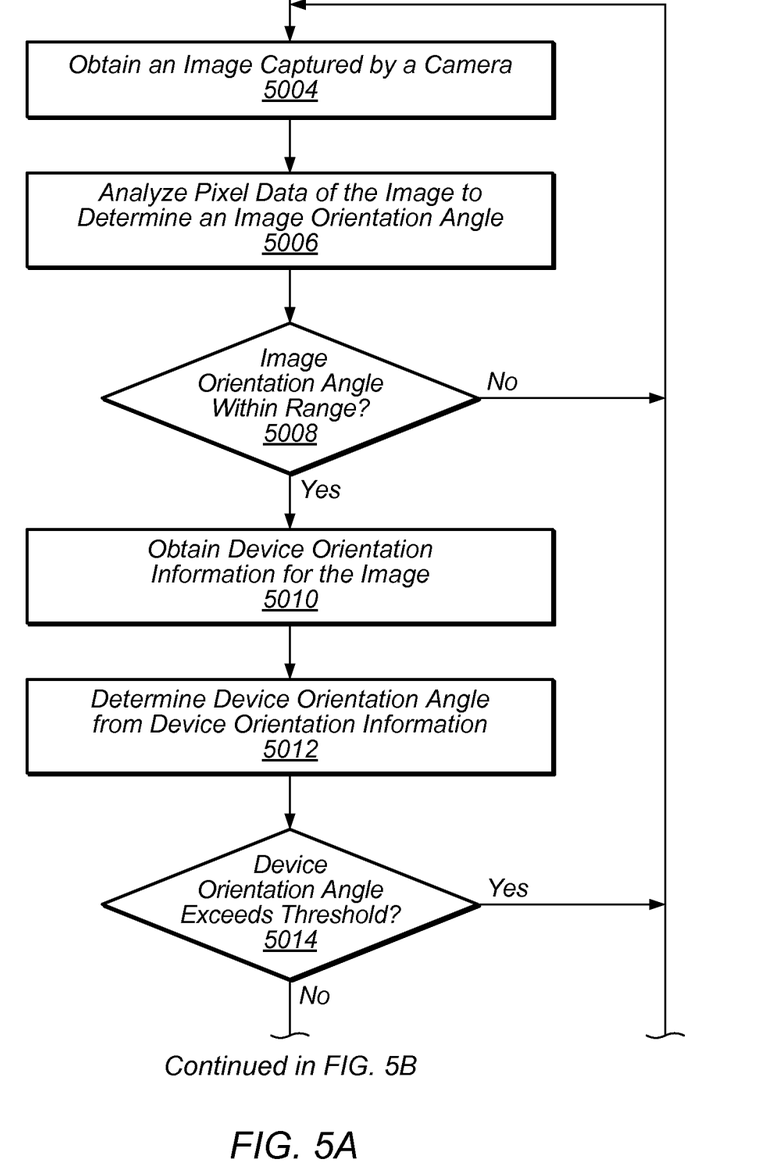
FIGS. 5A and 5B illustrate a flow diagram of a method for determining a rotational offset in a camera system according to some embodiments.
Figure 5B:
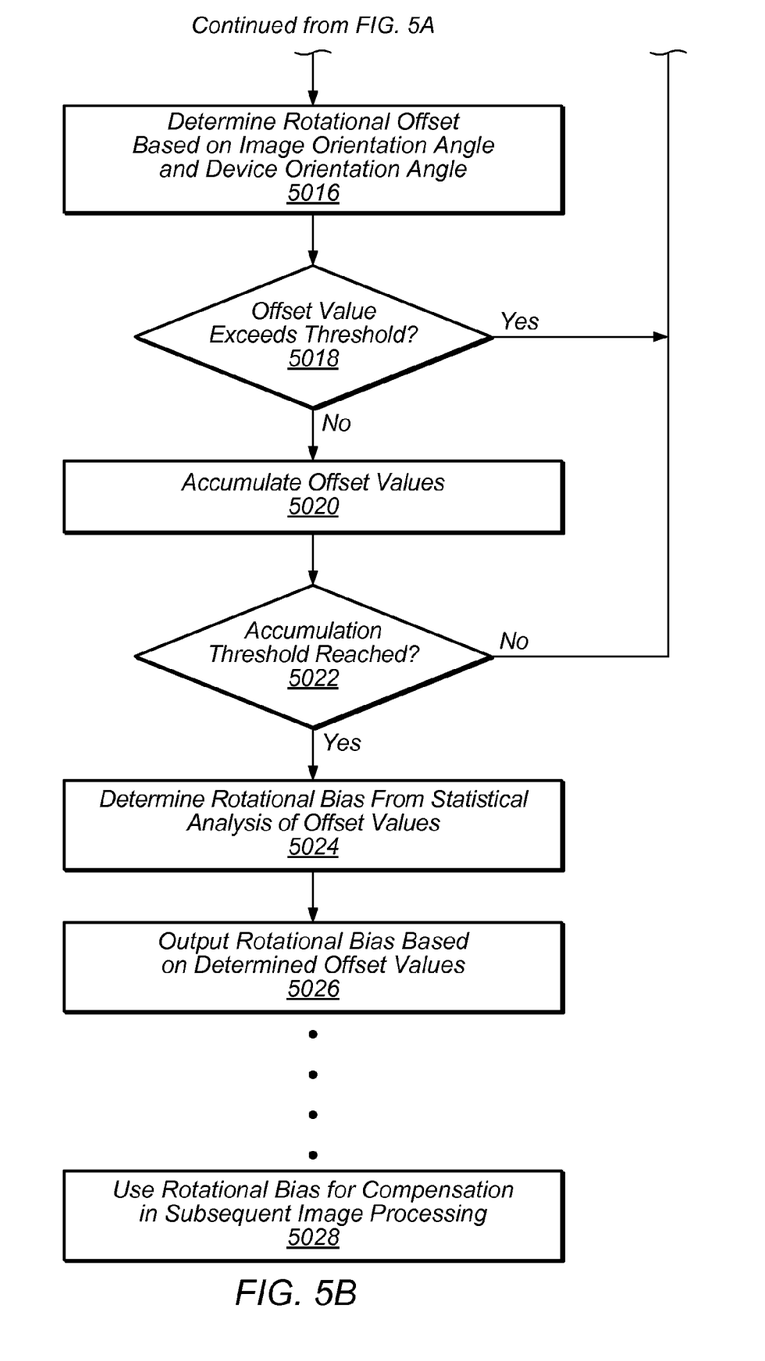

FIGS. 5A and 5B illustrate a flow diagram of a method for determining a rotational offset in a camera system according to some embodiments. In some embodiments, the method of FIGS. 5A and 5B may be performed by device 1000 in FIG. 1. Some portions of the method may be performed by rotation calibrator module 7001 in FIG. 7, for example. In addition to a method for determining a rotational offset in a camera, FIGS. 5A and 5B illustrate various decision points, some determine whether further processing is performed, for example. In some embodiments, the various decision points may occur in the order illustrated. However, in other embodiments, they may be ordered otherwise, or performed in parallel. For example, in some embodiments, it may be preferable to determine if a device orientation angle threshold has been exceeded earlier in the method. Earlier detection of values exceeding this threshold may help to prevent or reduce unnecessary processing, such as analyzing the pixel data of the image to determine an image orientation angle when the image orientation angle will not be used. In some embodiments, the various portions of the method, including both the elements and the decisions may be re-ordered in numerous various combinations without departing from the scope of the invention.

At block 5004, an image that was captured by the camera is obtained. For example, a stored image from memory 1002 or an image captured from camera sensor 1064 or 4120 may be obtained in real time. At block 5006, pixel data of the image is analyzed to determine an image orientation angle. For example, rotation calibrator module 7001 may analyze pixel data from the stored image from memory 1004 to determine an image orientation angle. For example, image orientation angle 4020 of FIG. 4. At 5008, it is determined whether the image orientation angle is within a range (e.g., a predetermined range). In some exemplary embodiments a maximum of the range may be 10 degrees, although the range may be configured by either a user or manufacturer. If the image orientation angle is outside the range, the method may return to obtain another image (block 5008, no). However, if the image orientation angle is within the range (block 5008, yes) device orientation information for the image may be obtained (block 5010). For example, a gravity vector from an accelerometer or other data from a gyroscope, for example, may be obtained from the meta data of the image or a file associated with the image.

A device orientation may be determined from the device orientation information (block 5012). For example, the rotation calibration module 7001, illustrated in FIG. 7, may determine the orientation of the device based on how far from +1 g the gravity vector is. At block 5014, it is determined whether the device orientation angle exceeds a threshold. If the threshold is exceeded (block 5014, yes) for example, if the magnitude of the gravity vector is more than a few percent (e.g., two percent) off in magnitude from +1 g. The threshold may be configurable, either by the user or the manufacturer. In another embodiment, a threshold may be exceeded if the pitch is determined to be greater than some predefined angle, for example, 25 degrees. For example, it may be assumed that the operator of the device may be intentionally looking down or up or the horizon may not be the focus of the image capture. In such cases, the method may return to obtain another image at 5004. The determination based upon pitch may be performed earlier in the process so as to prevent unnecessary processing. If the threshold is not exceeded, for example, if the gravity vector is within 2 percent or the pitch is determined to be less than 25 degrees, the method continues (block 5014, no).

At block 5016, a rotational offset is determined based on the image orientation angle and the device orientation angle. At block 5018, it is determined whether the offset value exceeds a threshold. If the threshold is exceeded, the method may return to obtain another image (block 5004). For example, if there is more than a 5 degree difference between the image orientation angle and the device orientation angle, the rotational offset may be discarded or simply not used for further computation of a rotational bias. If the threshold is not exceeded, the offset value(s) may be accumulated (block 5020). For example, offset values for numerous images may be accumulated, or a single offset value may be stored. At block 5022, it is determined whether an accumulation threshold has been reached. If so (block 5022, yes) the method continues to block 5024. If not (block 5022, no) the method may return to obtain another image (block 5004). At block 5024, a rotational bias is determined from statistical analysis of the offset values. For example, the offset values may be statistically analyzed to determine a pattern, an average, a mean or some other measure of a rotational bias from the offset values. At block 5026, based upon the determined offsets, the rotational bias may be output. For example, rotation calibrator module 7001 may output the rotational bias to memory 1002 or to other modules not illustrated. In some embodiments, the rotational bias may be used for compensation in subsequent image processing (block 5028). For example, a sweep panorama or cropping process FIG. 6 illustrates a method of determining an image orientation angle according to some embodiments. In some embodiments, the method is performed by rotation calibrator module 7001, illustrated in FIG. 7. To determine alignment, it may be possible to take advantage of natural images characteristic vertical orientation of trees, buildings that are aligned with gravity or horizontal orientation of the horizon and even strata that, on average, are aligned perpendicular to gravity.

For some embodiments, FIG. 6 illustrates a method of determining a horizontal or vertical line using edges in the spatial domain that have a signature in the spatial frequency domain.

At block 6002, image data is processed. In some embodiments, processing includes scaling the image or clipping the image to a square. Other processing that may be used includes edge detection, or various filters, such as a hamming window. At block 6004, pixel data is transformed using frequency domain techniques. For example the pixel data of an image may be transformed using a transform such as an FFT. Based on the pixel data, a horizontal line may be determined (block 6006). In some embodiments, a dominant angle determined by the frequency analysis may be identified as the horizontal line. An angle between the horizontal line and the x-axis of the image is calculated (block 6008). IN some embodiments, the calculated angle is the image orientation angle.

Figure 7:
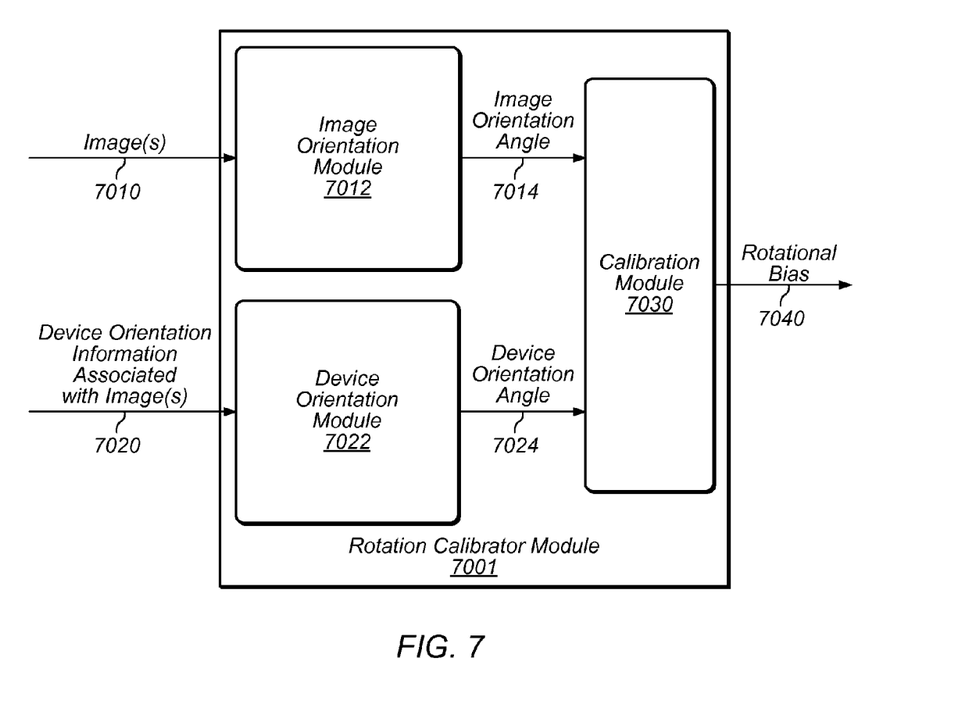
FIG. 7 illustrates a module for determining a rotational bias in accordance with various embodiments.

FIG. 7 illustrates a module for determining a rotational bias in accordance with various embodiments. In some embodiments, the rotation calibrator module 7001 of FIG. 7 is part of device 1000 in FIG. 1. The rotation calibrator module 7001 may perform some functions associated with the methods disclosed herein. For example, rotation calibrator module 7001 may perform some of the functions described in the methods illustrated in FIGS. 2, 5, and 6. In general, rotation calibrator module 7001 takes images 7010 and device orientation information associated with the images 7020 as input and produces a rotational bias 7040. The rotational bias may be of the camera sensor relative to the device, of the orientation sensor to the device, or of the sensors relative to each other, for example.

Rotation calibrator module 7001 includes image orientation module 7012 that takes images 7010 as input and produces an image orientation angle 7014 as output. In some embodiments, the image orientation module receives images from memory 1002. The image orientation module processes the image data to determine an image orientation angle. In some embodiments, the image orientation module processes the image data in accordance with functionality described in the method illustrated in FIG. 6 to determine the image orientation angle and pass the image orientation angle to calibration module 7040.

Rotation calibrator module 7001 includes device orientation module 7022 that takes device orientation information associated with an image as input and produces a device orientation angle as output. In some embodiments, device orientation module 7022 receives the device orientation information in the metadata of the image, and in other embodiments, the device orientation information may be part of another, related file. In some embodiments, the device orientation information indicates the orientation of the device (or the orientation sensor) at the time the image was captured. The device orientation module 7022 may take the device orientation information 7020 and determine a device orientation angle 7024. For example, if the device orientation information is a gravity vector, the device orientation module may determine an angle orthogonal to the gravity vector as the device orientation angle and output the angle to the calibration module 7030.

Rotation calibrator module 7001 includes calibration module 7030 that takes an image orientation angle and a device orientation angle as input and determines a rotational offset for the image. The calibration module 7030 may perform this determination for numerous images to determine numerous rotational offsets. The calibration module 7030 may statistically analyze the numerous rotational offsets to determine a rotational bias 7040 that is output from the calibration module 7030. The rotational bias 7040 may be stored by the calibration module 7030, may be output to memory 1002, or may be output to other components of the device, for example.

What is claimed is:

1. A device comprising:
   a camera configured to capture images;
   an orientation sensor configured to provide orientation information for the device;
   one or more processors; and
   memory storing program instructions executable by the one or more processors to:
      obtain an image captured by the camera, wherein orientation information from the orientation sensor is associated with the image, wherein the orientation information is from the time of capture of the image;
      analyze pixel data of the image to determine an image orientation angle for the image;
      obtain the orientation sensor information for the image;
      determine a device orientation angle from the orientation sensor information; and
      based on the image orientation angle and the device orientation angle, determine a rotational offset, wherein the rotational offset is relative to the camera or orientation sensor.

2. The device of claim 1, wherein to analyze pixel data of the image to determine an image orientation angle for the image, the program instructions are further executable to:
   determine a horizon line for the image from application of a frequency domain technique to the captured image; and
   calculate an angle for the image as the image orientation angle for the image, wherein the angle is between the horizon line for the image and an x-axis of the image.

3. The device of claim 1, wherein the program instructions are further executable by the one or more processors to:
   output a rotational bias based on the determined rotational offset; and
   use the rotational bias for compensation in a horizon adjustment associated with a cropping or panorama function of the device.

4. The device of claim 3, wherein the rotational bias indicates a rotational angle of the orientation sensor or a rotational angle of the camera with respect to the housing of the device.

5. The device of claim 1, wherein the program instructions are further executable by the one or more processors to:
   for a plurality of images, repeat said obtain an image, said analyze pixel data, said obtain the orientation sensor information, said determine a device orientation angle, and said based on the image orientation angle and the device orientation angle, determine a rotational offset, wherein the rotational offset is relative to the camera or orientation sensor; wherein said repeat comprises:
      determine whether the image orientation angle is within a predetermined range and not determine a rotational offset for the image for the image when the image orientation angle is outside the predetermined range;
   output a plurality of respective rotational offsets for said plurality of images; and
   statistically analyze at least a portion of the plurality of rotational offsets for a respective portion of the plurality of images to determine the rotational bias of the device for use in compensation in subsequent image processing, wherein the determined rotational bias is based on the statistical analysis.

6. The device of claim 5, wherein to statistically analyze at least a portion of the plurality of rotational offsets, the program instructions are further executable by the one or more processors to:

determine whether one of the plurality of rotational offsets exceeds a threshold; and discard a particular one of the plurality of rotational offsets from the statistical analysis for a particular one of the plurality of rotational offsets that exceeds a threshold.

7. The device of claim 5, wherein said repeat further comprises discontinue computing a rotational offset for the image associated with a camera angle that exceeds a device orientation threshold.

8. A method, comprising:
performing by one or more computing devices having one or more processors:
obtaining an image captured by a camera, wherein orientation information from an orientation sensor is associated with the image, wherein the orientation information is from the time of capture of the image;
analyzing pixel data of the image to determine an image orientation angle for the image;
obtaining the orientation sensor information for the image;
determining a device orientation angle from the orientation sensor information; and
based on the image orientation angle and the device orientation angle, determining a rotational offset, wherein the rotational offset is relative to the camera or orientation sensor.

9. The method of claim 8, further comprising:
determining a horizon line for the image from application of a frequency domain technique to the captured image; and
calculating an angle for the image as the image orientation angle for the image, wherein the angle is between the horizon line for the image and an x-axis of the image.

10. The method of claim 8, further comprising:
outputting a rotational bias based on the determined rotational offset; and
using the rotational bias for compensation in a horizon adjustment associated with a cropping or sweep panorama function of the device.

11. The method of claim 10, wherein the rotational bias indicates a rotational angle of the orientation sensor or a rotational angle of the camera with respect to the housing of the device.

12. The method of claim 8, further comprising:
for a plurality of images, repeating said obtaining an image, said analyzing pixel data, said obtaining the orientation sensor information, said determining a device orientation angle, and said based on the image orientation angle and the device orientation angle, determining a rotational offset, wherein the rotational offset is relative to the camera or orientation sensor; wherein said repeat comprises:
determining whether the image orientation angle is within a predetermined range and not determining a rotational offset for the image for the image when the image orientation angle is outside the predetermined range;
outputting a plurality of respective rotational offsets for said plurality of images; and
statistically analyzing at least a portion of the plurality of rotational offsets for a respective portion of the plurality of images to determine the rotational bias of the device for use in compensation in subsequent image processing, wherein the determined rotational bias is based on the statistical analysis.

13. The method of claim 12, further comprising:
determining whether one of the plurality of rotational offsets exceeds a threshold; and
discarding a particular one of the plurality of rotational offsets from the statistical analysis for a particular one of the plurality of rotational offsets that exceeds a threshold.

14. The method of claim 12, wherein said repeat further comprises discontinue computing a rotational offset for the image associated with a camera angle that exceeds a device orientation threshold.

15. A non-transitory computer readable storage medium storing program instructions executable to perform:
obtaining an image captured by a camera, wherein orientation information from an orientation sensor is associated with the image, wherein the orientation information is from the time of capture of the image;
analyzing pixel data of the image to determine an image orientation angle for the image;
obtaining the orientation sensor information for the image;
determining a device orientation angle from the orientation sensor information; and
based on the image orientation angle and the device orientation angle, determining a rotational offset, wherein the rotational offset is relative to the camera or orientation sensor.

16. The non-transitory computer readable storage medium of claim 15, further comprising:
determining a horizon line for the image from application of a frequency domain technique to the captured image; and
calculating an angle for the image as the image orientation angle for the image, wherein the angle is between the horizon line for the image and an x-axis of the image.

17. The non-transitory computer readable storage medium of claim 15, further comprising:
outputting a rotational bias based on the determined rotational offset; and
using the rotational bias for compensation in a horizon adjustment associated with a cropping or sweep panorama function of the device.

18. The non-transitory computer readable storage medium of claim 17, wherein the rotational bias indicates a rotational angle of the orientation sensor or a rotational angle of the camera with respect to the housing of the device.

19. The non-transitory computer readable storage medium of claim 18, further comprising:
determining whether one of the plurality of rotational offsets exceeds a threshold; and
discarding a particular one of the plurality of rotational offsets from the statistical analysis for a particular one of the plurality of rotational offsets that exceeds a threshold.

20. The non-transitory computer readable storage medium of claim 17, further comprising:
for a plurality of images, repeating said obtaining an image, said analyzing pixel data, said obtaining the orientation sensor information, said determining a device orientation angle, and said based on the image orientation angle and the device orientation angle, determining a rotational offset, wherein the rotational offset is relative to the camera or orientation sensor; wherein said repeat comprises:
determining whether the image orientation angle is within a predetermined range and not determining a rotational offset for the image for the image when the image orientation angle is outside the predetermined range;

outputting a plurality of respective rotational offsets for said plurality of images; and statistically analyzing at least a portion of the plurality of rotational offsets for a respective portion of the plurality of images to determine the rotational bias of the device for use in compensation in subsequent image processing, wherein the determined rotational bias is based on the statistical analysis.

* * * * *